Figure 1:
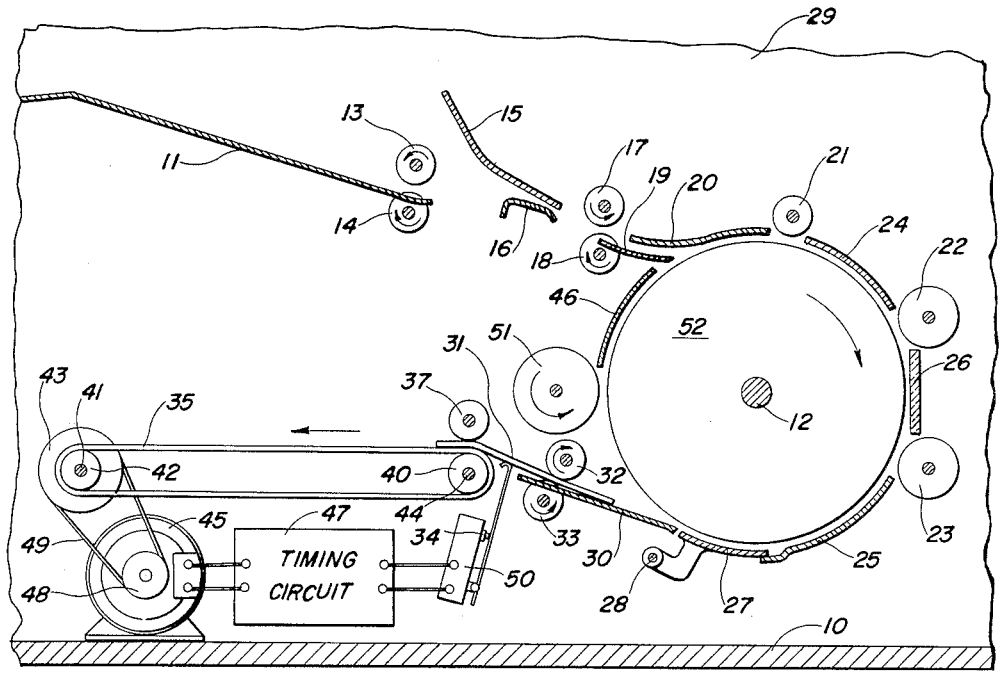

Jan. 4, 1966             J. F. EGAN             3,227,444

REVERSAL UNIT FOR DOCUMENT COPYING APPARATUS

Filed Aug. 30, 1963

JOHN F. EGAN
INVENTOR.

BY
ATTORNEYS

United States Patent Office 3,227,444
Patented Jan. 4, 1966

3,227,444
REVERSAL UNIT FOR DOCUMENT COPYING APPARATUS
John F. Egan, Rochester, N.Y., assignor to Eastman Kodak Company, Rochester, N.Y., a corporation of New Jersey
Filed Aug. 30, 1963, Ser. No. 305,650
6 Claims. (Cl. 271—65)

The present invention relates to document copying apparatus for recording both sides of documents, and more particularly, to a mechanism for use in such apparatus for selectively reversing the document so that the obverse and reverse faces of the document are successively presented for recording. The reversal unit of the present invention is particularly adapted for use with a continuous-flow, drum type microfilmer such as disclosed in the patent to A. E. Schubert et al., No. 2,253,052, dated August 19, 1941.

In known reversal units for copying apparatus, such as the above-referred to microfilmer having a rotating drum for transporting a document through a recording station, the reversal unit document conveyor surface is driven in a single direction towards the rotating drum. When the document is directed into the reversal unit after one side has been copied in the recording station, the direction of movement of the document is opposed to that of the document conveyor surface. Such a reversal unit has the disadvantage of occasionally tending to crumple or fold or otherwise mutilate the document, particularly in the case of thin non-rigid documents. The present invention overcomes this disadvantage by providing a reversal unit in which the document and the document conveyor surface are always moving in the same direction. This relationship is hereinafter referred to in this specification and claims as a "positive feed." For example, the conveyor surface is moving away from the drum as a document is discharged to it from the recording station, but is moving toward the drum when the document is redirected back onto the drum and to that recording station.

Thus, the present invention comprises, in one of its aspects, a reversibly driven conveying means for moving a document away from and back to a rotating drum, means for directing a document onto said conveying means, and means actuated by the movement or position of the document to reverse the direction of the conveying means when the document is in position to be positively fed from said conveying means back onto the drum.

One object of the present invention is to provide an improved document reversal unit.

Another object of the present invention is to provide a reversal unit for a document copying apparatus.

Still another object of the present invention is to provide a reversal unit having a positive feed arrangement for documents in a drum type document copying apparatus.

Yet another object of the present invention is to provide an improved document reversal unit for a photographic apparatus in which the document conveyor surface of the unit moves in the same direction as the document thereon to form a positive feed and in which reversal of the surface is actuated by and in timed relation to the movement of the document.

Figure 2:
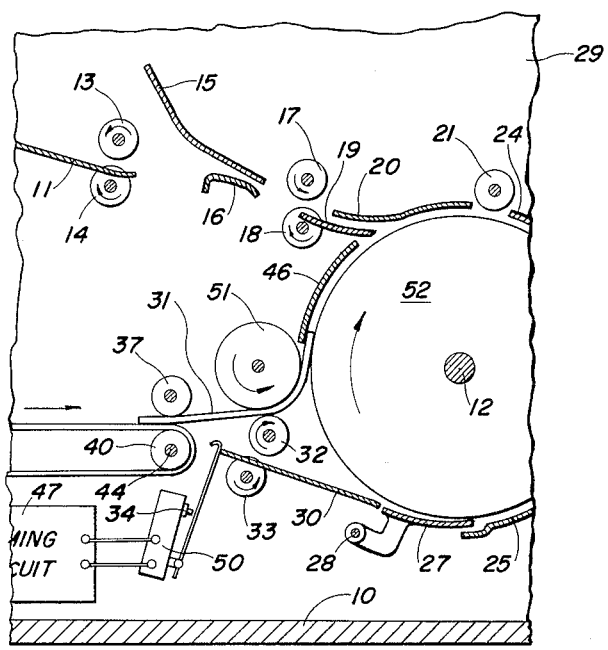

Still other objects and advantages of the present invention will become readily apparent to those skilled in the art from the following description with reference to the drawing in which like characters denote like parts, and wherein:

FIG. 1 is a vertical section view of a document handling mechanism embodying the present invention and showing a document being directed to the reversal unit; and FIG. 2 is a partial vertical section view showing a document being returned from the reversal unit to the copying apparatus.

Although the inventive concept presently disclosed can be utilized in many types of document handling apparatus, it is particularly described with relation to a continuous-flow microfilmer having a rotating drum against the periphery of which a document is held and carried through a photographing station, i.e. the station from which an image of the document is projected for recording on microfilm. In FIG. 1, the reversal unit of the present invention is illustrated in association with a document conveying drum 52 of the microfilmer having a supporting base member 10 and side member 29. Although this drum is not a part of the present invention, it is briefly described to more clearly show its association with the novel reversal mechanism.

Documents to be copied are placed on a feed table 11 and are individually fed from the table to the rotating drum 52, between rollers 13 and 14 and along a path defined by guide plates 15, 16, 19 and 20, and additional rollers 17 and 18. The drum rotates around shaft 12, and although no source of power is shown, the drum is driven by an electric motor or other suitable means. Upon contacting the rotating drum, the leading edge of the document is frictionally picked up and carried on the drum periphery between the drum and idler rollers 21, 22 and 23, and guide plates 24 and 25. As the document is carried along this path the document moves through a recording station 26 where the obverse side, i.e. the side away from the drum, is recorded. As the document is discharged from the recording station after the obverse side is recorded, deflecting fingers 27, rotatably mounted on shaft 28, are used to strip the document from the drum into a receiving hopper or to direct the document to the reversal unit of the present invention so that the document is properly presented relative to the drum for the recording of its reverse side. As shown in FIG. 1, the fingers 27 are positioned to direct the document to the reversal unit. After the document passes the strip fingers 27 as it is directed toward the reversal unit, it drops away or is otherwise stripped from the rotating drum and the guide plate 30 directs it between feed rollers 32 and 33.

According to the preferred embodiment the reversal unit is positioned to conveniently receive a document from the rotating drum and comprises a reversibly driven belt conveyor 35 trained about pulleys 40 and 42, which rotate about driven shaft 44 and driving shaft 41, respectively. The shafts are journaled in the side member 29 of the mircrofilmer. Driving shaft 41 can be reversibly driven by any suitable means, but the preferred mechanism comprises a reversible motor 45 operatively connected to shaft 41 through a belt 49 which is trained about pulleys 43 and 48. Motor 45 is energized at the same time that the microfilmer is turned on and drives the belt 35 in a counterclockwise direction as indicated by the arrow in FIG. 1. As a document is fed onto belt 35, the belt continues to move in a counterclockwise direction so that the belt and the document 31 are moving in the same direction. Idler roller 37 guides the document onto the belt surface and holds the document in contact therewith.

Several arrangements can be utilized to control the reversing operation of the present invention. The reversal unit can be controlled in timed relation to some other operation within the microfilmer such as, for example, lamp relays in the electrical circuitry for the recording station energizing a series of relays associated with the functioning of the reversal unit. However, for purposes of illustration, a document actuated microswitch 50 is positioned along the document path between the rotating drum 52 and the conveyor belt 35, and is connected in series with the reversible motor 45 and an adjustable time delay circuit 47. Circuit 47 is of a type which is well known and commercially available. As the document 31 is directed to the reversal unit, the microswitch is engaged by the leading end of the document and moved against contact 34, as shown in FIG. 1, so that the circuit is closed and the timed interval begins. The adjustable timed delay is preset to allow sufficient time after actuation of the switch 50 by the document for the trailing end of the document to substantially clear the drum and all guide plates and rollers leading to the reversal unit before the direction of drive is reversed. By "substantially clear the drum" is meant any position of the document from which the return feed of the document onto the drum by the reversal unit does not misdirect or entangle the document in the apparatus. Thus in place of the disclosed guide means a system of rollers, guide plates, or other guide means could be designed for moving and directing a document from the reversal unit back onto the drum at a time when the trailing edge of the document may still be in contact with the drum.

After the preset timed interval has elapsed and the document is in position on belt 35 to be reversed, the direction of drive of the motor is reversed by the action of the time delay circuit 47 and the belt is driven clockwise as indicated by the arrow in FIG. 2. Document 31 is directed between rollers 32 and 51 and back toward and against the rotating drum. What was the trailing end of the document now becomes the leading end as the document is directed between guide plate 46 and the drum, and is carried around the drum periphery. The obverse side of the document is now in contact with the drum and the reverse side is presented for copying in the recording station.

After the document passes the microswitch 50, the microswitch moves away from contact 34 and the circuit is opened. After a preset time has elapsed for feeding the document back toward the rotating drum, the open circuit causes the belt to again move in a counterclockwise direction. In timed sequence with the movement of a document through the microfilmer, the strip fingers 27 are pivoted against drum 52 as shown in FIG. 2, so that the document is directed into the receiving hopper which is not shown. The strip fingers are then moved back into the position shown in FIG. 1, and the next document to be recorded is fed into the apparatus from feed table 11 so that the cycle for recording both sides of the document can be repeated.

From the foregoing disclosure it is evident that the novel reversal unit provides a positive feed for documents in document copying apparatus. Although the invention has been described in detail with particular reference to preferred embodiments thereof, it will be readily understood that variations and modifications can be effected within the spirit and scope of the invention as described hereinabove and as defined in the appended claims.

Having now particularly described my invention, what I desire to secure by Letters Patent of the United States and what I claim is:

1. In a document copying apparatus having a recording station and document transporting means for moving a document through said station with a reverse side of the document in contact with said transporting means and the obverse side of the document presented for recording, a reversal mechanism comprising:
   (a) driven conveyor means having a document-receiving moving surface which is located adjacent to such transporting means for receiving the document thereon from such transporting means and for moving the document to a position substantially clear of such transporting means;
   (b) means responsive to the document being received on said receiving surface for reversing the direction of movement of said receiving surface and for moving the document onto such transporting means with the obverse side of the document in contact with such transporting means and the reverse side of the document presented for recording.

2. A reversal mechanism in accordance with claim 1 wherein said responsive means comprises: switch means disposed along a path of document travel defined by such transporting means and said receiving surface, for sensing the movement of the document in said path and for reversing the direction of movement of said receiving surface in timed relation to arrival of the document at a predetermined location on said receiving surface.

3. A reversal mechanism in accordance with claim 2 wherein said switch means comprises: a document engaging trip switch located in said document path between such recording station and said substantially clear position.

4. A reversal mechanism in accordance with claim 2 wherein said responsive means further comprises: a timing circuit operatively associated with said switch means for delaying the reversing of the direction of movement of said receiving surface for a predetermined period of time after said switch means senses the document.

5. In a document copying apparatus having a recording station and means including a drum which rotates in a predetermined direction for moving a document through said station with the reverse side of the document in contact with the periphery of the drum and the obverse side of the document presented for recording, a reversal mechanism comprising:
   (a) reversibly driven conveyor means having a document receiving surface located adjacent to such drum periphery for receiving thereon and for moving the recorded document to a position substantially clear of the drum;
   (b) means for reversing the direction of movement of said receiving surface to move said document onto such drum with said reverse side presented for recording, including,
      (1) switch means disposed along the path of document travel and responsive to movement of the document in said path, and
      (2) a timing circuit operatively associated with said switch means for delaying the movement of said receiving surface in said reverse direction for a predetermined period of time after the switch means responds to the movement of the document.

6. In a document copying apparatus having a recording station and means including a rotating drum for moving a document through said station with the reverse side of the document in contact with the periphery of the drum and the obverse side of the document presented for recording, a reversal mechanism comprising:
   (a) a reversibly driven belt conveyor mounted adjacent to such drum periphery for receiving a document discharged therefrom;

(b) means for driving the conveyor in a direction such that the document is transported by said conveyor to a position substantially clear of such drum;

(c) time delay switch means responsive to the movement of a document past a given point in its path of movement for reversing the direction of conveyor belt travel and for moving the document onto said drum periphery with said obverse side in contact with the drum so that the reverse side is presented for recording.

References Cited by the Examiner
UNITED STATES PATENTS

| | | | |
|---|---|---|---|
| 2,253,052 | 8/1941 | Schubert | 271—3 |
| 2,472,931 | 6/1949 | Yohn | 88—24 |
| 2,695,098 | 11/1954 | Rendel | 209—75 |
| 3,047,288 | 7/1962 | Ramm | 271—65 |

M. HENSON WOOD, JR., *Primary Examiner.*

ROBERT B. REEVES, *Examiner.*